(12) United States Patent
Ono et al.

(10) Patent No.: US 11,680,612 B2
(45) Date of Patent: Jun. 20, 2023

(54) CLUTCH CONTROL DEVICE

(71) Applicant: HONDA MOTOR CO., LTD., Tokyo (JP)

(72) Inventors: Junya Ono, Wako (JP); Tatsuya Ryuzaki, Wako (JP); Kazuyuki Fukaya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 17/442,148

(22) PCT Filed: Mar. 12, 2020

(86) PCT No.: PCT/JP2020/010817
§ 371 (c)(1),
(2) Date: Sep. 23, 2021

(87) PCT Pub. No.: WO2020/195895
PCT Pub. Date: Oct. 1, 2020

(65) Prior Publication Data
US 2022/0170521 A1 Jun. 2, 2022

(30) Foreign Application Priority Data
Mar. 28, 2019 (JP) .............................. JP2019-063139

(51) Int. Cl.
*F16D 48/06* (2006.01)

(52) U.S. Cl.
CPC .... *F16D 48/06* (2013.01); *F16D 2500/10412* (2013.01); *F16D 2500/1117* (2013.01);
(Continued)

(58) Field of Classification Search
CPC ..................... F16D 48/06; F16D 48/08; F16D 2500/10412; F16D 2500/1117;
(Continued)

(56) References Cited

U.S. PATENT DOCUMENTS 9,663,093 B2* 5/2017 Kaneko ................. B60T 8/3215
2002/0055415 A1* 5/2002 Yoshikawa ........... B60W 10/06
477/166
(Continued)

FOREIGN PATENT DOCUMENTS

JP          01-119434       5/1989
JP          2003-161336     6/2003
(Continued)

OTHER PUBLICATIONS

International Search Report and Written Opinion for International Application No. PCT/JP2020/010817 dated Jun. 16, 2020, 8 pages.

*Primary Examiner* — Edwin A Young
(74) *Attorney, Agent, or Firm* — Amin, Turocy & Watson, LLP

(57) ABSTRACT

This clutch control device includes an engine (13), a transmission (21), a clutch device (26) configured to connect and disconnect motive power transmission between the engine (13) and the transmission (21), a clutch actuator (50) configured to drive the clutch device (26) and change a clutch capacity, a control parameter sensor (58) configured to detect a control parameter of the clutch capacity and a control unit (60) configured to calculate a control target value (TP) of the control parameter. The control unit (60) causes the clutch device (26) to perform a stroke in a connection direction until an actual measurement value of the control parameter reaches the control target value (TP). The control unit (60) corrects the control target value (TP) in accordance with at least one of a rotational speed (NE) of the engine (13) and a difference between the target value and the actual measurement value of the control parameter in a stroke process (K3) of causing the clutch device (26) to perform the stroke in the connection direction.

10 Claims, 9 Drawing Sheets

(52) U.S. Cl.
CPC ........... *F16D 2500/3026* (2013.01); *F16D 2500/3067* (2013.01); *F16D 2500/5012* (2013.01); *F16D 2500/50269* (2013.01); *F16D 2500/7041* (2013.01); *F16D 2500/70626* (2013.01)

(58) Field of Classification Search
CPC ..... F16D 2500/3026; F16D 2500/3067; F16D 2500/5012; F16D 2500/50269; F16D 2500/7041; F16D 2500/70626
See application file for complete search history.

(56) References Cited

U.S. PATENT DOCUMENTS

| 2002/0170758 | A1* | 11/2002 | Shimabukuro | B60W 10/08 |
| | | | | 903/918 |
| 2010/0041515 | A1* | 2/2010 | Ohkubo | F16D 25/08 |
| | | | | 477/175 |

FOREIGN PATENT DOCUMENTS

| JP | 2008-151230 | 7/2008 |
| JP | 2012-002299 | 1/2012 |
| JP | 5025486 | 9/2012 |

\* cited by examiner

CLUTCH CONTROL DEVICE

TECHNICAL FIELD

The present invention relates to a clutch control device.

The present application claims priority based on Japanese Patent Application No. 2019-063139 filed on Mar. 28, 2019, the contents of which are incorporated herein by reference.

BACKGROUND ART

Conventionally, there is a method in which a connection/disconnection operation is automatically performed on a clutch by driving an actuator. In the above clutch, it is necessary to appropriately adjust a capacity of the clutch at a touch point where the connection of the clutch is started. This is because a rotational speed of an engine decreases when the capacity of the clutch is excessively large and the rotational speed of the engine increases when the capacity of the clutch is excessively small.

On the other hand, Patent Document 1 discloses a configuration in which the movement speed of a driving member for connecting and disconnecting the clutch is adjusted in a plurality of stages in accordance with a state of the engine.

RELATED ART DOCUMENT

Patent Document

Patent Document 1: Japanese Patent No. 5025486

SUMMARY

Problems to be Solved by the Invention

However, when a state of the clutch is switched from a disconnected state to a connected state, a rotational speed of the engine and parameters for controlling the clutch may actually unexpectedly change or a change to be made may not be made due to various causes.

Therefore, an objective of the present invention is to enable a clutch connection position to be adjusted accurately in a clutch control device.

Means for Solving the Problem

As the solution to the above-described problems, aspects of the present invention have the following configurations.

(1) According to an aspect of the present invention, there is provided a clutch control device including: an engine; a transmission; a clutch device configured to connect and disconnect motive power transmission between the engine and the transmission; a clutch actuator configured to drive the clutch device and change a clutch capacity; a control parameter sensor configured to detect a control parameter of the clutch capacity; and a control unit configured to calculate a control target value of the control parameter, wherein the control unit causes the clutch device to perform a stroke in a connection direction until an actual measurement value of the control parameter reaches the control target value, and wherein the control unit corrects the control target value in accordance with at least one of a rotational speed of the engine and a difference between the target value and the actual measurement value of the control parameter in a stroke process of causing the clutch device to perform the stroke in the connection direction.

(2) In the clutch control device according to the above-described aspect (1), when the rotational speed of the engine is less than or equal to a predetermined lower limit value in the stroke process, the control unit may cause the control target value to be decreased.

(3) In the clutch control device according to the above-described aspect (1) or (2), when the rotational speed of the engine is greater than or equal to a predetermined upper limit value in the stroke process, the control unit may cause the control target value to be increased.

(4) In the clutch control device according to any one of the above-described aspects (1) to (3), when a difference between the control target value and the actual measurement value has continued for a predetermined time period in the stroke process, the control unit may correct the control target value.

(5) In the clutch control device according to any one of the above-described aspects (1) to (4), the stroke process may be a stroke process from a standby state in which the clutch device has been disconnected to a touch point at which a connection is started.

(6) In the clutch control device according to any one of the above-described aspects (1) to (5), the control target value may be a value corresponding to a point at which a connection of the clutch device is started.

(7) In the clutch control device according to any one of the above-described aspects (1) to (6), the control unit may switch control between control for controlling the clutch actuator under a given condition and feedback control for approximating the control parameter to the control target value in the stroke process.

(8) In the clutch control device according to the above-described aspect (7), the control unit may change a motor duty ratio of the clutch actuator in accordance with an accelerator opening degree until the control is switched to the feedback control.

Advantage of the Invention

According to the clutch control device described in the above-described aspect (1) of the present invention, it is possible to accurately adjust the connection position of the clutch device in accordance with the engine state by correcting the target value of the control parameter on the basis of at least one of the rotational speed of the engine and the difference, for example, when the rotational speed of the engine decreases or increases unexpectedly or when the difference between the target value of the control parameter and the actual measurement value increases, in the process of causing the clutch device to perform the stroke in the connection direction.

According to the clutch control device described in the above-described aspect (2) of the present invention, when the rotational speed of the engine is less than or equal to the lower limit value in the stroke process, for example, it is determined that the clutch device is performing the stroke in the connection direction faster than expected and the control target value is decreased. Thereby, it is possible to delay a connection start timing of the clutch device in accordance with the engine state and accurately adjust the connection position of the clutch device in accordance with the engine state.

According to the clutch control device described in the above-described aspect (3) of the present invention, when the rotational speed of the engine is greater than or equal to the upper limit value in the stroke process, for example, it is determined that the clutch device is performing the stroke in the connection direction slower than expected and the control target value is increased. Thereby, it is possible to advance a connection start timing of the clutch device in accordance with the engine state and accurately adjust the connection position of the clutch device in accordance with the engine state.

According to the clutch control device described in the above-described aspect (4) of the present invention, when the difference between the target value of the control parameter and the actual measurement value has continued for the predetermined time period, for example, it is determined that a clutch operation timing has deviated due to various causes and the control target value is corrected. Thereby, the connection position of the clutch device can be accurately adjusted.

According to the clutch control device described in the above-described aspect (5) of the present invention, the connection position of the clutch device can be accurately adjusted by performing the correction of the control target value as described above in the stroke process from the standby state in which the clutch device has been disconnected to the touch point at which the connection is started.

According to the clutch control device described in the above-described aspect (6) of the present invention, the connection position of the clutch device can be accurately adjusted by correcting the control target value (the clutch capacity) corresponding to the point at which the connection of the clutch device is started (the touch point).

According to the clutch control device described in the above-described aspect (7) of the present invention, the actual measurement value of the control parameter can be approximated to the control target value more smoothly by switching the control between the control of the given condition and the feedback control in the stroke process.

According to the clutch control device described in the above-described aspect (8) of the present invention, the clutch actuator is driven according to the motor duty ratio control based on the accelerator opening degree until the control is switched to the feedback control, so that it becomes possible to stably output the hydraulic pressure that could not be output stably with only the feedback control, and consequently it is possible to control the fine hydraulic pressure accurately.

DESCRIPTION OF THE EMBODIMENTS

Hereinafter, embodiments of the present invention will be described with reference to the drawings. Also, in the following description, forward, rearward, left, and right directions and the like are the same as those in a vehicle to be described below unless otherwise mentioned. Also, an arrow FR indicating a forward direction with respect to the vehicle, an arrow LH indicating a left direction with respect to the vehicle, and an arrow UP indicating an upward direction with respect to the vehicle are shown in appropriate places in drawings used in the following description.

<Whole Vehicle>

Figure 1:
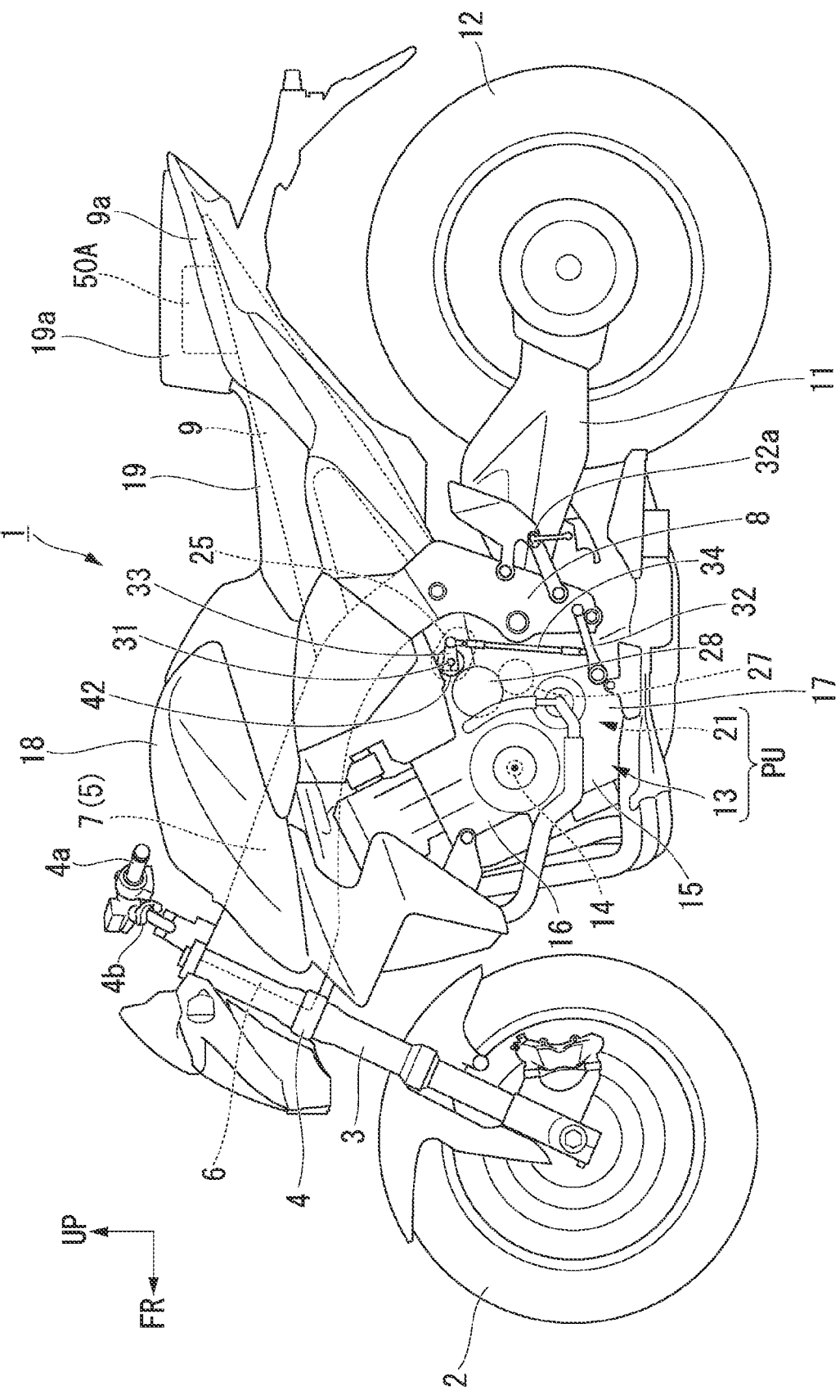
FIG. 1 is a left side view of a motorcycle according to an embodiment of the present invention.

As illustrated in FIG. 1, the present embodiment is applied to a motorcycle 1 that is a saddle riding-type vehicle. A front wheel 2 of the motorcycle 1 is supported by lower ends of one pair of left and right front forks 3. Upper parts of the left and right front forks 3 are supported by a head pipe 6 of a front end of a vehicle body frame 5 via a steering stem 4. A bar-type steering handle 4a is mounted on a top bridge of the steering stem 4.

The vehicle body frame 5 includes the head pipe 6, main tubes 7 that extend downward and rearward from the head pipe 6 at the center in a vehicle width direction (a left/right direction), left and right pivot frames 8 connected in the downward direction of a rear end of the main tubes 7 and a seat frame 9 connected in the rearward direction of the main tubes 7 and the left and right pivot frames 8. In the left and right pivot frames 8, a front end of a swing arm 11 is pivoted to be swingable. At a rear end of the swing arm 11, a rear wheel 12 of the motorcycle 1 is supported.

In the upward direction of the left and right main tubes 7, a fuel tank 18 is supported. In the upward direction of the seat frame 9 in the rearward direction of the fuel tank 18, a front seat 19 and a rear seat cover 19a are aligned in front of and behind each other and supported. The periphery of the seat frame 9 is covered with a rear cowl 9a. In the downward direction of the left and right main tubes 7, a power unit PU that is a motor of the motorcycle 1 is suspended. For example, the power unit PU is linked with the rear wheel 12 via a chain-type transmission mechanism.

The power unit PU integrally includes an engine (an internal combustion engine) 13 positioned on a front side of the power unit PU and a transmission 21 positioned on a rear side of the power unit PU. For example, the engine 13 is a multiple cylinder engine in which a rotary shaft of a crank shaft 14 is aligned in the left/right direction (the vehicle width direction). The engine 13 raises a cylinder 16 above a front part of a crank case 15. A rear part of the crank case 15 is formed as a transmission case 17 that accommodates the transmission 21.

<Transmission>

Figure 2:
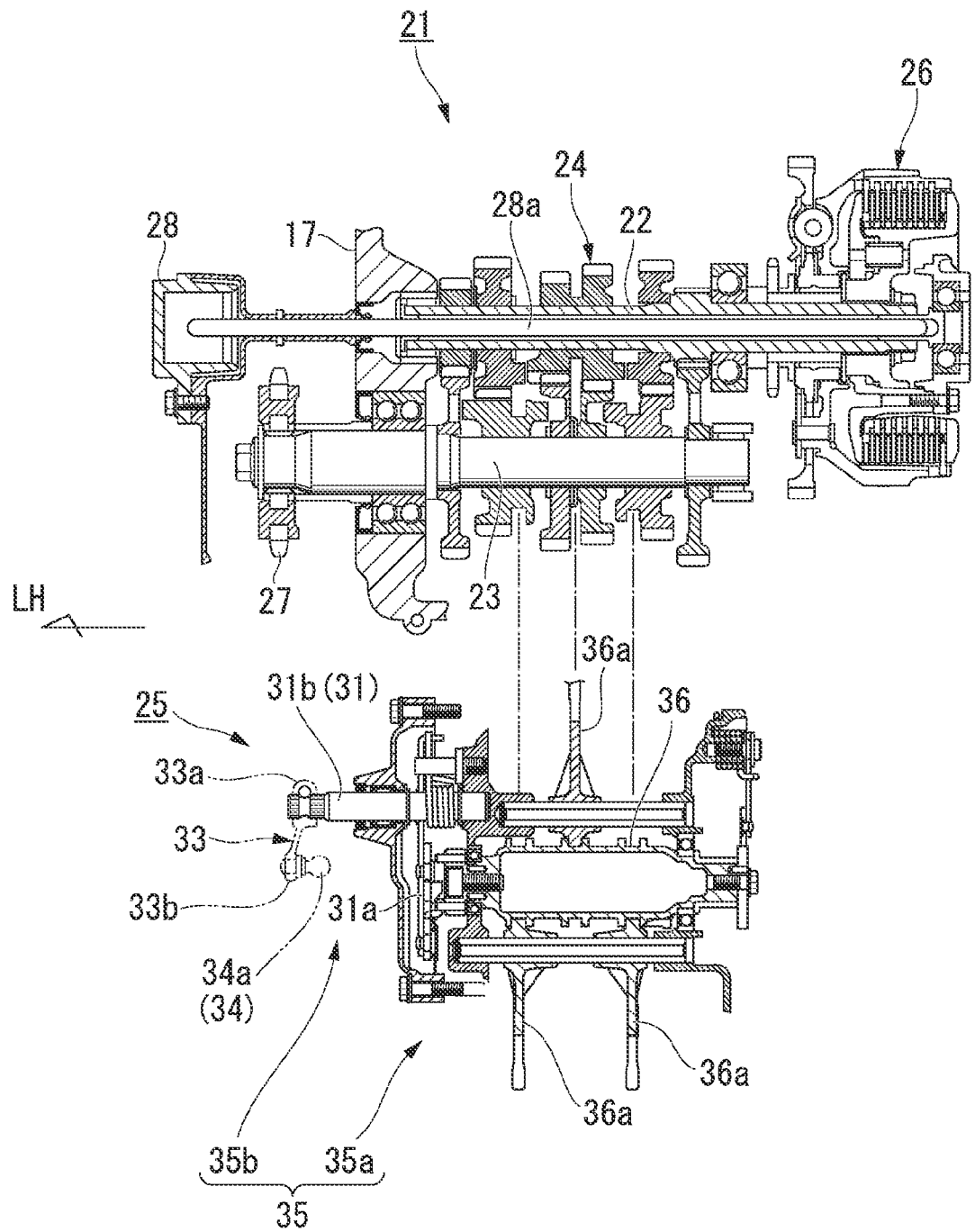
FIG. 2 is a cross-sectional view of a transmission and a change mechanism of the above-described motorcycle.

As illustrated in FIG. 2, the transmission 21 is a stepped transmission including a main shaft 22, a counter shaft 23, and a transmission gear group 24 disposed across both shafts 22 and 23. The counter shaft 23 constitutes an output shaft of the transmission 21 and the power unit PU. An end of the counter shaft 23 protrudes to the left side of a rear part of the crank case 15 and is connected to the rear wheel 12 via the chain-type transmission mechanism.

The transmission gear group 24 includes gears corresponding to the number of shift stages supported at both shafts 22 and 23. The transmission 21 is of a constant engagement type in which a pair of corresponding gears of the transmission gear group 24 are constantly engaged with each other between the shafts 22 and 23. A plurality of gears supported at both shafts 22 and 23 can be classified into a free gear that can rotate with respect to a corresponding shaft and a slide gear (a shifter) that is spline-fitted to a corresponding shaft. One of the free gear and the slide gear has a convex dog provided in an axial direction and the other has a concave slot provided in the axial direction so that the slot is engaged with the dog. That is, the transmission 21 is a so-called dog mission.

Figure 3:
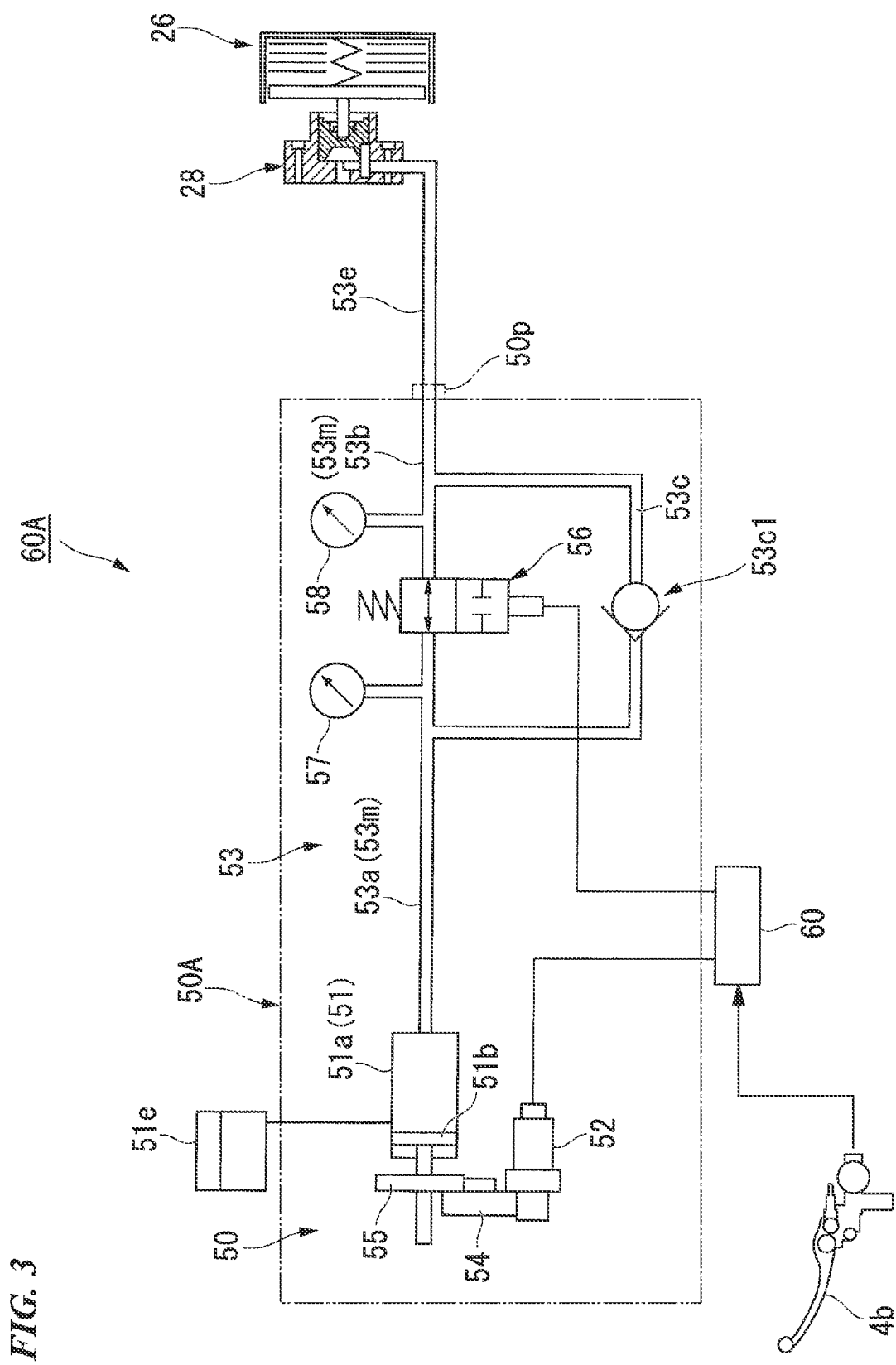
FIG. 3 is a schematic explanatory view of a clutch operating system including a clutch actuator.

Referring also to FIG. 3, the main shaft 22 and the counter shaft 23 of the transmission 21 are disposed to be aligned in front of and behind each other in the rearward direction of the crank shaft 14. A clutch device 26 operated by a clutch actuator 50 is coaxially disposed at a right end of the main shaft 22. For example, the clutch device 26 is a wet multiplate clutch and is a so-called normal open clutch. That is, the clutch device 26 reaches a connected state in which motive power transmission is enabled in accordance with the supply of a hydraulic pressure from the clutch actuator 50 and is returned to a disconnected state in which motive power transmission is disabled when there is no supply of the hydraulic pressure from the clutch actuator 50.

Referring to FIG. 2, rotation power of the crank shaft 14 is transmitted to the main shaft 22 via the clutch device 26 and is transmitted from the main shaft 22 to the counter shaft 23 via any gear pair of the transmission gear group 24. A drive sprocket 27 of the above-described chain-type transmission mechanism is attached to a left end of the counter shaft 23 that protrudes to the left side of a rear part of the crank case 15.

In the rearward and upward directions of the transmission 21, a change mechanism 25, which performs switching between gear pairs of the transmission gear group 24, is accommodated. The change mechanism 25 operates a plurality of shift forks 36a in accordance with the pattern of a lead groove formed on the outer periphery thereof in accordance with rotation of a shift drum 36 having a hollow cylindrical shape parallel to both shafts 22 and 23 and performs switching of a gear pair for use in motive power transmission between the shafts 22 and 23 in the transmission gear group 24.

The change mechanism 25 includes a shift spindle 31 parallel to the shift drum 36. In the change mechanism 25, at the time of rotation of the shift spindle 31, a shift arm 31a fixed to the shift spindle 31 rotates the shift drum 36, moves the shift fork 36a in the axial direction in accordance with the pattern of the lead groove, and switches a gear pair in which motive power transmission is enabled within the transmission gear group 24 (i.e., switches a shift stage).

The shift spindle 31 causes a shaft outer part 31b to protrude to an outward side (in the left direction) of the crank case 15 in the vehicle width direction such that the change mechanism 25 is operable. A shift load sensor 42 (a shift operation detecting means) is coaxially attached to the shaft outer part 31b of the shift spindle 31 (see FIG. 1). A swing lever 33 is attached to the shaft outer part 31b (or a rotation shaft of the shift load sensor 42) of the shift spindle 31. The swing lever 33 extends rearward from a base end part 33a that is fixed to the shift spindle 31 (or the rotation shaft) through clamp fixing and an upper end of a link load 34 is connected to a tip end part 33b thereof via an upper ball joint 34a so that it is freely swingable. A lower end of the link load 34 is connected to a shift pedal 32 that is operated by a driver using a foot via a lower ball joint (not illustrated) so that it is freely swingable.

As illustrated in FIG. 1, the shift pedal 32 has a front end supported at a lower part of the crank case 15 so that the shift pedal 32 is vertically swingable via a shaft in a left/right direction. A pedal part for hooking the driver's tiptoe placed on a step 32a is provided at a rear end of the shift pedal 32 and a lower end of the link load 34 is connected to a middle part in a front/back direction of the shift pedal 32.

As illustrated in FIG. 2, a shift change device 35, which includes the shift pedal 32, the link load 34, and the change mechanism 25 and performs gear switching of a gear shift step of the transmission 21, is configured. In the shift change device 35, an assembly (the shift drum 36, the shift forks 36a, and the like), which switches a shift stage of the transmission 21 inside the transmission case 17, will be referred to as a shift operating unit 35a and an assembly (the shift spindle 31, the shift arm 31a, and the like) that rotates around the shift spindle 31 when a shift operation for the shift pedal 32 is input and transmits this rotation to the shift operating unit 35a will be referred to as a shift operation receiving unit 35b.

Here, the motorcycle 1 employs a so-called semi-automated transmission system (an automated clutch-type transmission system) in which only a shift operation on the transmission 21 (a foot operation on the shift pedal 32) is performed by the driver and connection and disconnection operations on the clutch device 26 are automatically performed by electrical control in accordance with an operation on the shift pedal 32.

<Transmission System>

Figure 4:
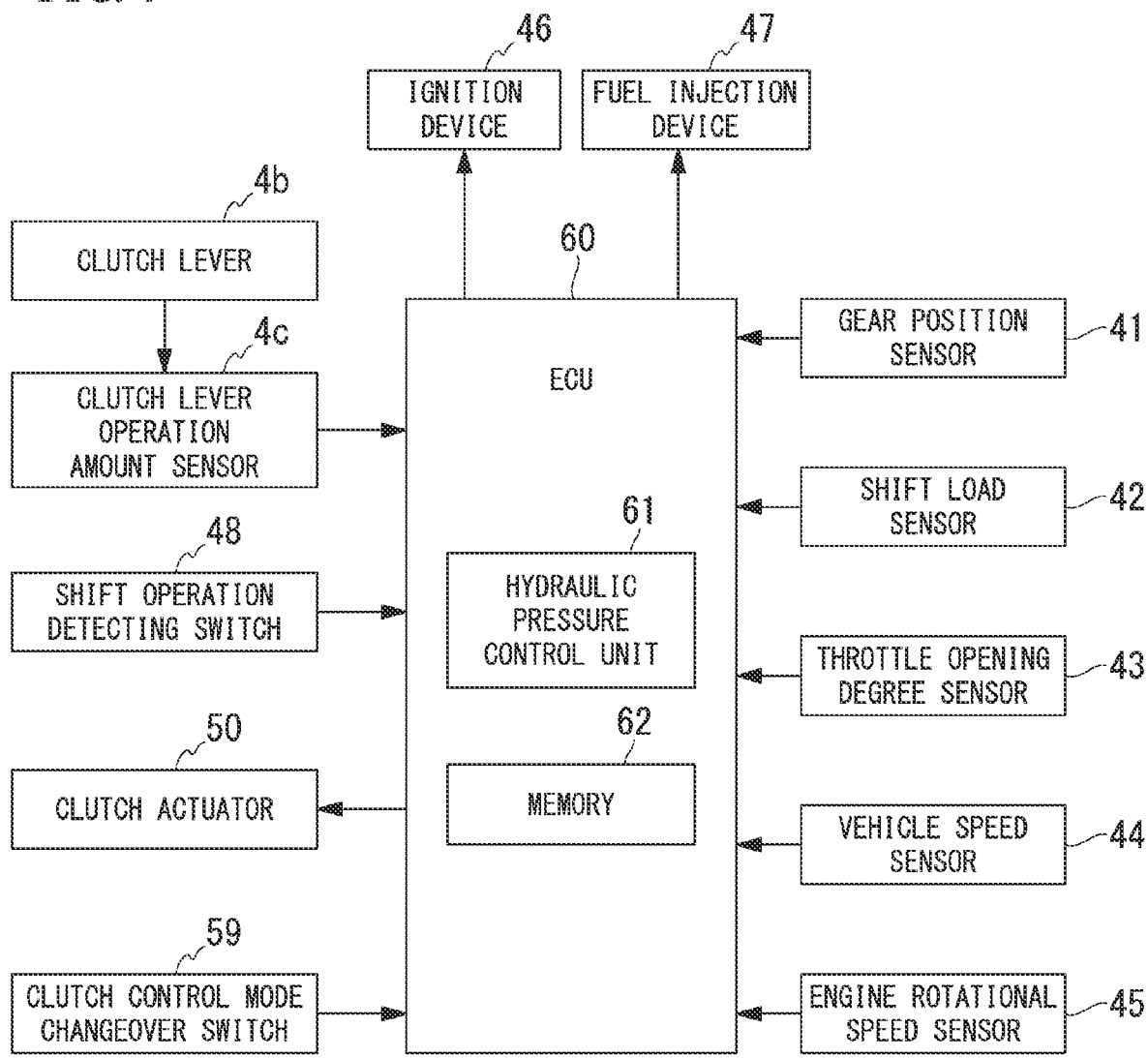
FIG. 4 is a block diagram of a transmission system.

As illustrated in FIG. 4, the above-described transmission system includes a clutch actuator 50, an electronic control unit (ECU) (control unit) 60, and various types of sensors 41 to 45.

The ECU 60 controls the operation of the clutch actuator 50 on the basis of detection information from a gear position sensor 41 that detects a shift stage from a rotation angle of the shift drum 36 and a shift load sensor (for example, a torque sensor) 42 that detects an operation torque input to the shift spindle 31, various types of vehicle state detection information from a throttle opening degree sensor 43, a vehicle speed sensor 44, and an engine rotational speed sensor 45, and the like and controls operations of an ignition device 46 and a fuel injection device 47. Detection information from hydraulic pressure sensors 57 and 58 and a shift operation detecting switch (a shift neutral switch) 48 to be described below is also input to the ECU 60.

Also, the ECU 60 includes a hydraulic pressure control unit (a clutch control unit) 61 and a memory (a storage unit) 62 and functions thereof will be described below.

Referring also to FIG. 3, the clutch actuator 50 can control a liquid pressure for connecting and disconnecting the clutch device 26 according to operation control by the ECU 60. The clutch actuator 50 includes an electric motor 52 (hereinafter simply referred to as a "motor 52") serving as a drive source and a master cylinder 51 driven by the motor 52. The clutch actuator 50 constitutes an integrated clutch control unit 50A together with the hydraulic circuit device 53 provided between the master cylinder 51 and a hydraulic pressure supply-discharge port 50p.

The ECU 60 calculates a target value of a hydraulic pressure (a target hydraulic pressure) supplied to a slave cylinder 28 for connecting and disconnecting the clutch device 26 on the basis of a preset calculation program and controls the clutch control unit 50A such that a hydraulic pressure (a slave hydraulic pressure or an actual measurement value) of the slave cylinder 28 side detected by the downstream-side hydraulic pressure sensor (the control parameter sensor) 58 is close to the target hydraulic pressure.

The master cylinder 51 causes a piston 51*b* inside a cylinder main body 51*a* to perform a stroke in accordance with driving of the motor 52 and enables hydraulic oil inside the cylinder main body 51*a* to be supplied and discharged with respect to the slave cylinder 28. In FIG. 3, reference symbol 55 denotes a conversion mechanism serving as a ball screw mechanism, reference symbol 54 denotes a transmission mechanism disposed across the motor 52 and the conversion mechanism 55, and reference symbol 51*e* denotes a reservoir connected to the master cylinder 51.

The hydraulic circuit device 53 includes a valve mechanism (a solenoid valve 56) for opening or blocking a middle portion of a main oil path (a hydraulic pressure supply/discharge oil path) 53*m* extending from the master cylinder 51 to the clutch device 26 side (the slave cylinder 28 side). The main oil path 53*m* of the hydraulic circuit device 53 can be divided into an upstream-side oil path 53*a* that is on the master cylinder 51 side from the solenoid valve 56 and a downstream-side oil path 53*b* that is on the slave cylinder 28 side from the solenoid valve 56. The hydraulic circuit device 53 further includes a bypass oil path 53*c* that bypasses the solenoid valve 56 and causes the upstream-side oil path 53*a* and the downstream-side oil path 53*b* to communicate with each other.

The solenoid valve 56 is a so-called normal open valve. A one-way valve 53*c*1 for causing hydraulic oil to flow in only one way from the upstream side to the downstream side is provided on the bypass oil path 53*c*. On the upstream side of the solenoid valve 56, an upstream-side hydraulic pressure sensor 57 for detecting a hydraulic pressure of the upstream-side oil path 53*a* is provided. On the downstream side of the solenoid valve 56, the downstream-side hydraulic pressure sensor 58 for detecting a hydraulic pressure of the downstream-side oil path 53*b* is provided.

As illustrated in FIG. 1, for example, the clutch control unit 50A is accommodated in the rear cowl 9*a*. The slave cylinder 28 is attached to the left side of the rear part of the crank case 15. The clutch control unit 50A and the slave cylinder 28 are connected via a hydraulic piping 53*e* (see FIG. 3).

As illustrated in FIG. 2, the slave cylinder 28 is coaxially disposed in the left direction of the main shaft 22. When a hydraulic pressure is supplied from the clutch actuator 50, the slave cylinder 28 presses a push load 28*a* passing through the inside of the main shaft 22 in the right direction. By pressing the push load 28*a* in the right direction, the slave cylinder 28 causes the clutch device 26 to operate in a connected state via the push load 28*a*. When there is no supply of the hydraulic pressure, the slave cylinder 28 releases the pressing of the push load 28*a* and returns the clutch device 26 to a disconnected state.

In order to maintain the clutch device 26 in the connected state, it is necessary to continue the supply of the hydraulic pressure and electric power is consumed to that extent. Therefore, as illustrated in FIG. 3, the solenoid valve 56 is provided in the hydraulic circuit device 53 of the clutch control unit 50A and the solenoid valve 56 is closed after the supply of the hydraulic pressure to the clutch device 26 side. Thereby, the hydraulic pressure supplied to the clutch device 26 side is maintained and a hydraulic pressure corresponding to a decrease in the pressure is configured to be supplemented (recharged by an amount corresponding to a leak), so that the energy consumption is inhibited.

<Clutch Control>

Figure 5:
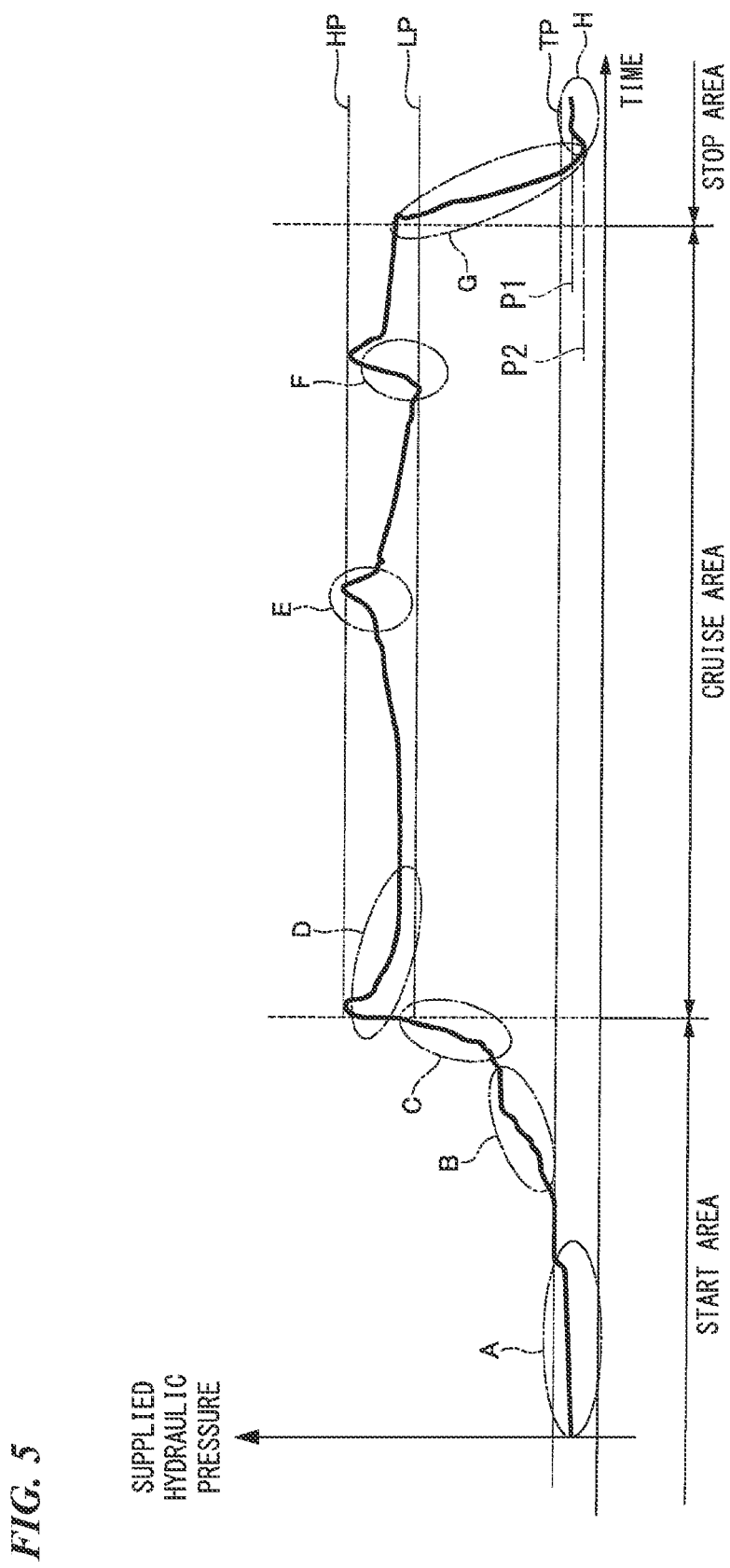
FIG. 5 is a graph illustrating a change in a supplied hydraulic pressure of the clutch actuator.

Next, an action of the clutch control system will be described with reference to a graph of FIG. 5. In the graph of FIG. 5, the vertical axis represents a supplied hydraulic pressure detected by the downstream-side hydraulic pressure sensor 58 and the horizontal axis represents elapsed time.

At the time of stopping (idling) of the motorcycle 1, the solenoid valve 56 controlled by the ECU 60 are in the valve open state. At this time, the slave cylinder 28 side (the downstream side) is in a low-pressure state having a pressure lower than a touch point hydraulic pressure TP and the clutch device 26 is in a non-fastened state (a disconnected state or a released state). This state corresponds to an area A of FIG. 5.

When the vehicle is in the in-gear stop state, electric power is supplied to the motor 52 and the low hydraulic pressure is generated. This is to immediately continue the connection of the clutch and start the vehicle.

When the motorcycle 1 is started, electric power is supplied only to the motor 52, and a hydraulic pressure is supplied from the master cylinder 51 to the slave cylinder 28 through the solenoid valve 56 of the valve open state if the rotational speed of the engine 13 is increased. When the hydraulic pressure of the slave cylinder 28 side (the downstream side) is increased to the touch point hydraulic pressure TP or higher, the fastening of the clutch device 26 is started and the clutch device 26 enters a half-clutch state in which partial motive power can be transmitted. Thereby, the motorcycle 1 can be smoothly started. This state corresponds to an area B of FIG. 5.

Thereafter, when a difference between input rotation and output rotation of the clutch device 26 decreases and the hydraulic pressure of the slave cylinder 28 side (the downstream side) reaches a lower limit retaining hydraulic pressure LP, the fastening of the clutch device 26 transitions to a locked state and all the driving force of the engine 13 is transmitted to the transmission 21. This state corresponds to an area C of FIG. 5. The areas A to C form a start area.

When a hydraulic pressure is supplied from the master cylinder 51 side to the slave cylinder 28 side, the solenoid valve 56 is in the valve open state, the motor 52 is driven to rotate in a normal direction according to the application of an electric current to the motor 52, and the master cylinder 51 is pressed. Thereby, the hydraulic pressure of the slave cylinder 28 side is adjusted to a clutch fastening hydraulic pressure. At this time, the driving of the clutch actuator 50 is subjected to feedback control on the basis of a hydraulic pressure detected by the downstream-side hydraulic pressure sensor 58.

When the hydraulic pressure of the slave cylinder 28 side (the downstream side) reaches an upper limit retaining hydraulic pressure HP, electric power is supplied to the solenoid valve 56, the solenoid valve 56 performs a valve closing operation, the supply of electric power to the motor 52 is stopped, and the generation of the hydraulic pressure is stopped. That is, the upstream side enters a low pressure state in accordance with the release of the hydraulic pressure, whereas the downstream side is maintained in the high pressure state (the upper limit retaining hydraulic pressure HP). Thereby, without the master cylinder 51 generating a hydraulic pressure, the clutch device 26 is maintained in the fastened state, and the power consumption can be inhibited while running of the motorcycle 1 is enabled.

Here, a shift may also be performed immediately after a hydraulic pressure is filled in the clutch device 26 according to a shift operation. In this case, before the solenoid valve 56 performs a valve closing operation and causes the upstream side to enter a low pressure state, the motor 52 is reversely driven in a valve open state of the solenoid valve 56 and depressurizes the master cylinder 51 and communicates with the reservoir 51e to relieve hydraulic pressure of the clutch device 26 side to the master cylinder 51 side. At this time, the driving of the clutch actuator 50 is subjected to feedback control on the basis of a hydraulic pressure detected by the upstream-side hydraulic pressure sensor 57.

Even if the solenoid valve 56 is closed and the clutch device 26 is maintained in the fastened state, the hydraulic pressure of the downstream side gradually decreases (leaks) as in an area D of FIG. 5. That is, the hydraulic pressure of the downstream side gradually decreases due to primary causes such as a leakage of the hydraulic pressure and a temperature decrease according to deformation and the like of seals of the solenoid valve 56 and the one-way valve 53c1.

On the other hand, as in the area E of FIG. 5, a hydraulic pressure of the downstream side may also be increased due to an increase in the temperature or the like. Because any small change in the hydraulic pressure of the downstream side can be absorbed by an accumulator (not illustrated) and the motor 52 and the solenoid valve 56 are operated every time the hydraulic pressure changes, power consumption is not increased.

As in an area E of FIG. 5, when a hydraulic pressure of the downstream side has increased to the upper limit retaining hydraulic pressure HP, the solenoid valve 56 is set in a valve open state in a stepwise manner due to a decrease in the supply of electric power to the solenoid valve 56 or the like and the hydraulic pressure of the downstream side is relieved toward the upstream side.

As in an area F of FIG. 5, when the hydraulic pressure of the downstream side has decreased to the lower limit retaining hydraulic pressure LP, the supply of electric power to the motor 52 is started in a state in which the solenoid valve 56 has been closed and the hydraulic pressure of the upstream side is increased. When the hydraulic pressure of the upstream side is higher than the hydraulic pressure of the downstream side, this hydraulic pressure is supplied (recharged) to the downstream side via the bypass oil path 53c and the one-way valve 53c1. When the hydraulic pressure of the downstream side becomes the upper limit retaining hydraulic pressure HP, the supply of electric power to the motor 52 is stopped and the generation of the hydraulic pressure is stopped. Thereby, the hydraulic pressure of the downstream side is maintained between the upper limit retaining hydraulic pressure HP and the lower limit retaining hydraulic pressure LP and the clutch device 26 is maintained in the fastened state. The areas D to F are set as a cruise area.

If the transmission 21 becomes neutral when the motorcycle 1 is stopped, the supply of electric power to the motor 52 and the solenoid valve 56 is stopped together. Thereby, the master cylinder 51 stops the generation of a hydraulic pressure and stops the supply of a hydraulic pressure to the slave cylinder 28. The solenoid valve 56 is in a valve open state and the hydraulic pressure within the downstream-side oil path 53b is returned to the reservoir 51e. According to the above, the slave cylinder 28 side (the downstream side) is in a low pressure state with a hydraulic pressure lower than the touch point hydraulic pressure TP and the clutch device 26 is in a non-fastened state. This state corresponds to areas G and H of FIG. 5. The areas G and H are set as a stop area.

If the transmission 21 is in the neutral state when the motorcycle 1 is stopped, the supply of electric power to the motor 52 is cut off and the motorcycle 1 is in the stopped state. Thus, the hydraulic pressure is close to zero.

On the other hand, if the transmission 21 remains in an in-gear state when the motorcycle 1 stops, a standby state in which a standby hydraulic pressure WP is applied to the slave cylinder 28 side is formed.

The standby hydraulic pressure WP is a hydraulic pressure that is slightly lower than the touch point hydraulic pressure TP at which the connection of the clutch device 26 starts and is a hydraulic pressure (a hydraulic pressure applied to the areas A and H of FIG. 5) at which the clutch device 26 is not connected. In accordance with the application of the standby hydraulic pressure WP, ineffective stroke elimination for the clutch device 26 (the cancellation of a backlash or operating reaction force of each part, the application of a preload to a hydraulic path, or the like) can be performed and operation responsiveness at the time of the connection of the clutch device 26 is improved.

<Shift Control>

Next, shift control of the motorcycle 1 will be described.

In an in-gear stop state in which a gear position of the transmission 21 is in an in-gear state of the first speed and a vehicle speed is lower than a setting value corresponding to stopping, the motorcycle 1 according to the present embodiment performs control for decreasing the standby hydraulic pressure WP supplied to the slave cylinder 28 when a shift operation on the shift pedal 32 from the first speed to neutral is performed.

Here, when the motorcycle 1 is in the stop state and the gear position of the transmission 21 is any shift stage position other than neutral, i.e., when the transmission 21 is in the in-gear stop state, the standby hydraulic pressure WP that has been preset is supplied to the slave cylinder 28.

The standby hydraulic pressure WP is set to a first setting value P1 (see FIG. 5) that is a standard standby hydraulic pressure at normal times (in the case of a non-detected state in which a shift operation on the shift pedal 32 is not detected). Thereby, the clutch device 26 is in a standby state in which the ineffective stroke elimination has been performed and the responsiveness at the time of clutch fastening is improved. That is, when the rotational speed of the engine 13 is increased by the driver increasing a degree of throttle opening, the fastening of the clutch device 26 is immediately started in accordance with the supply of a hydraulic pressure to the slave cylinder 28 and quick start and acceleration of the motorcycle 1 can be performed.

The motorcycle 1 includes a shift operation detecting switch 48 in addition to the shift load sensor 42 so that the driver's shift operation on the shift pedal 32 is detected.

In the in-gear stop state, when the shift operation detecting switch 48 detects a shift operation from the first speed to neutral, the hydraulic pressure control unit 61 performs control for setting the standby hydraulic pressure WP to a second setting value P2 (a low standby hydraulic pressure; see FIG. 5) lower than the first setting value P1 before the shift operation.

When the transmission 21 is in the in-gear state, the standard standby hydraulic pressure corresponding to the first setting value P1 is supplied to the slave cylinder 28 at normal times, so that so-called dragging is slightly generated in the clutch device 26. At this time, a dog and a slot (a dog hole) engaged with each other in the dog clutch of the transmission 21 may press each other in the rotation direction and cause resistance to disengagement and the shift operation may become heavy. In this case, if the standby hydraulic pressure WP supplied to the slave cylinder 28 is decreased to a low standby hydraulic pressure corresponding to the second setting value P2, the engagement between the dog and the slot can be easily released and the shift operation becomes light.

<Clutch Control Mode>

Figure 6:
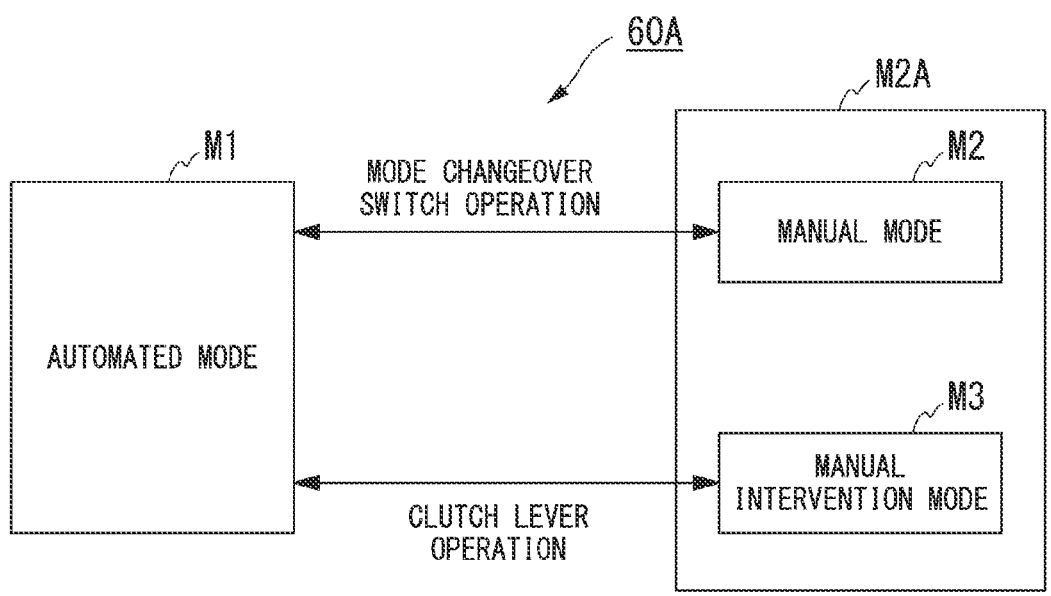
FIG. 6 is an explanatory diagram illustrating the transition of a clutch control mode according to the embodiment of the present invention.

As illustrated in FIG. 6, the clutch control device 60A according to the present embodiment has three types of clutch control modes. The clutch control mode appropriately transitions between three types of modes including an automated mode M1 in which automated control is performed, a manual mode M2 in which a manual operation is performed, and a manual intervention mode M3 in which a temporary manual operation is performed in accordance with operations on a clutch control mode changeover switch 59 (see FIG. 4) and a clutch lever 4b (see FIG. 1). Also, targets including the manual mode M2 and the manual intervention mode M3 will be referred to as a manual system M2A.

The automated mode M1 is a mode in which the clutch device 26 is controlled by calculating a clutch capacity suitable for a traveling state in accordance with automated start/shift control. The manual mode M2 is a mode in which the clutch device 26 is controlled by calculating a clutch capacity in accordance with an occupant's clutch operation instruction. The manual intervention mode M3 is a temporary manual operation mode in which the clutch device 26 is controlled by receiving a clutch operation instruction from the occupant during the automated mode M1 and calculating a clutch capacity from the clutch operation instruction. Also, the manual intervention mode is set such that the mode is returned to the automated mode M1 when the occupant stops (completely releases) the operation on the clutch lever 4b during the manual intervention mode M3.

The clutch control device 60A according to the present embodiment generates a clutch control hydraulic pressure by driving the clutch actuator 50 (see FIG. 3). Thus, the clutch control device 60A starts control from a clutch off state (a disconnected state) in the automated mode M1 at the time of system startup. Also, because a clutch operation is unnecessary when the engine 13 is stopped, the clutch control device 60A is set to return to the clutch off state in the automated mode M1.

In the embodiment, the clutch control device 60A constitutes the clutch control system together with the clutch lever 4b.

Basically, in the automated mode M1, clutch control is automatically performed and the motorcycle 1 is enabled to travel without any lever operation. In the automated mode M1, a clutch capacity is controlled according to a degree of throttle opening, an engine speed, a vehicle speed, and a shift sensor output. Thereby, the motorcycle 1 can start without an engine failure (engine stop) in only a throttle operation and a shift can be performed in only a shift operation. However, at the time of an extremely low speed corresponding to idling, the clutch device 26 may be automatically disconnected. Also, by gripping the clutch lever 4b in the automated mode M1, the mode is switched to the manual intervention mode M3 and the clutch device 26 can be arbitrarily disconnected.

On the other hand, in the manual mode M2, a clutch capacity is controlled according to a lever operation by the occupant. Switching between the automated mode M1 and the manual mode M2 can be performed by operating the clutch control mode changeover switch 59 (see FIG. 4) while the vehicle is stopped. Also, the clutch control device 60A may include an indicator indicating validity of a lever operation at the time of the transition to the manual system M2A (the manual mode M2 or the manual intervention mode M3).

In the manual mode M2, basically, clutch control is manually performed and a clutch hydraulic pressure can be controlled in accordance with an operation angle of the clutch lever 4b. Thereby, the connection and disconnection of the clutch device 26 can be controlled in accordance with the occupant's intention and the vehicle can also travel by the clutch device 26 being connected at the time of an extremely low speed corresponding to idling. However, an engine failure may be caused due to a lever operation and automatic starting in only a throttle operation cannot be performed. Also, clutch control is automatically performed through intervention at the time of a shift operation in the manual mode M2.

Although the connection and disconnection of the clutch device 26 are automatically performed by the clutch actuator 50 in the automated mode M1, a manual operation can be temporarily performed through intervention in the automated control of the clutch device 26 when a manual clutch operation is performed on the clutch lever 4b (the manual intervention mode M3).

<Manual Clutch Operation>

As illustrated in FIG. 1, the clutch lever 4b serving as a manual clutch operating element is attached to a base side (an inner side in the vehicle width direction) of the left grip of the steering handle 4a. The clutch lever 4b has no mechanical connection with the clutch device 26 using a cable, a hydraulic pressure, or the like and functions as an operating element for transmitting a clutch operation request signal to the ECU 60. That is, the motorcycle 1 employs a clutch-by-wire system in which the clutch lever 4b and the clutch device 26 are electrically connected to each other.

Referring also to FIG. 4, the clutch lever operation amount sensor 4c, which detects the amount of operation (the rotation angle) of the clutch lever 4b, is integrally provided in the clutch lever 4b. The clutch lever operation amount sensor 4c converts the amount of operation of the clutch lever 4b into an electrical signal and outputs the electrical signal. In a state in which the operation on the clutch lever 4b is valid (the manual system M2A), the ECU 60 drives the clutch actuator 50 on the basis of an output of the clutch lever operation amount sensor 4c. Also, the clutch lever 4b and the clutch lever operation amount sensor 4c may be formed as an integrated body or separate bodies.

The motorcycle 1 includes the clutch control mode changeover switch 59 that switches between control modes of a clutch operation. The clutch control mode changeover switch 59 can arbitrarily perform switching between the automated mode M1 in which clutch control is automatically performed under a predetermined condition and the manual mode M2 in which clutch control is manually performed in accordance with an operation on the clutch lever 4b. For example, the clutch control mode changeover switch 59 is provided in a handle switch attached to the steering handle 4a. Thereby, the occupant can easily operate the clutch control mode changeover switch 59 at the time of normal driving.

<Control of Stroke Process>

Figure 7:
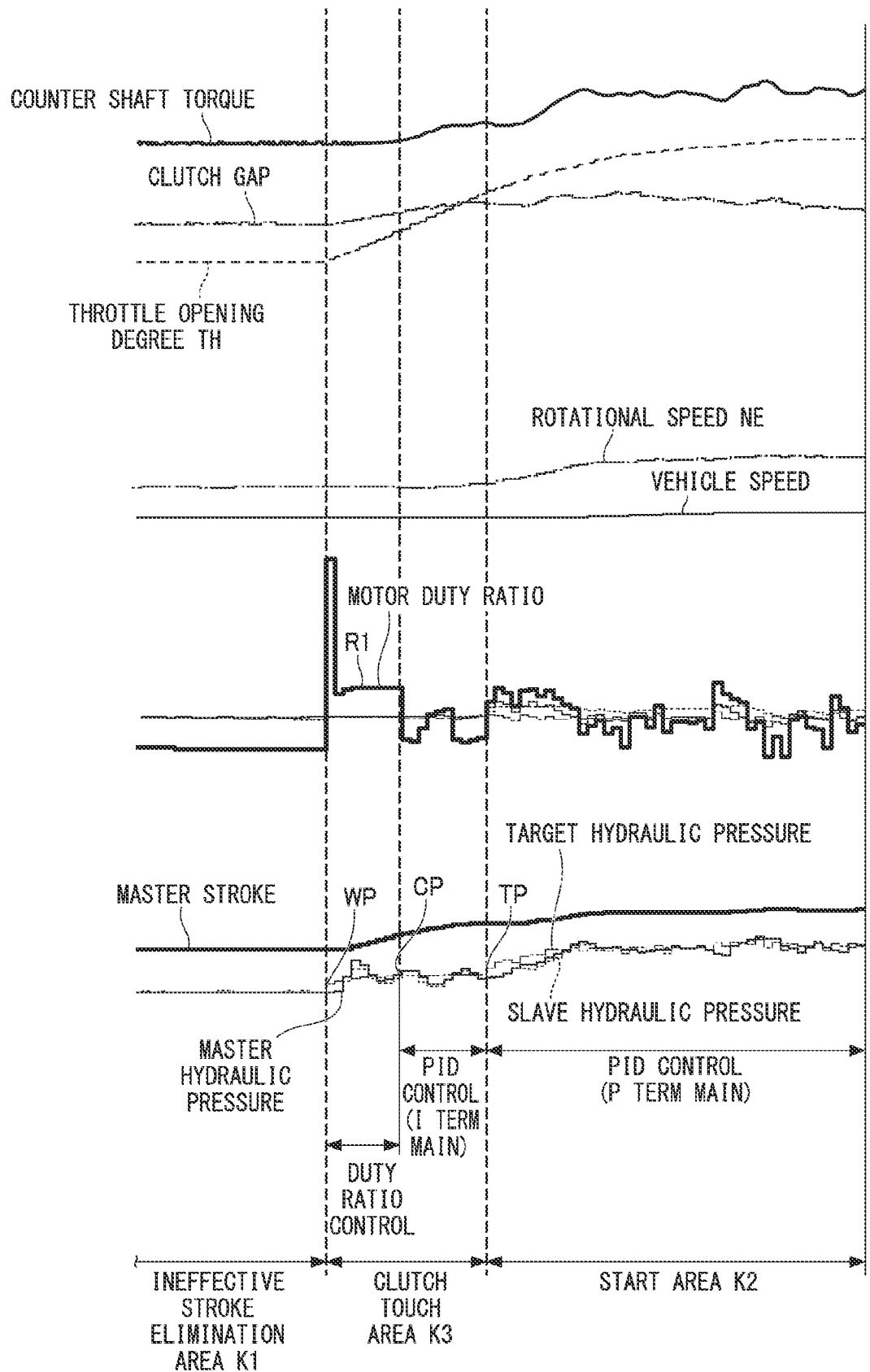
FIG. 7 is a time chart illustrating changes in control parameters in the clutch control device according to the embodiment of the present invention.

As illustrated in FIG. 7, at the time of activation of the system (including the time of re-activation immediately after the idle stop), the engine 13 starts driving, and the clutch control device 60A starts control from the clutch off state in the automated mode M1. At this time, the clutch device 26 is in a standby state in which the standby hydraulic pressure WP has been supplied and the ineffective stroke elimination has been performed. When the throttle opening degree TH increases in the above state (i.e., when there is a start request from the driver), the clutch device 26 transitions from the disconnected state to the connected state, increases the rotational speed NE of the engine 13, and causes the motorcycle 1 to be started.

In the control process of the clutch device 26, there are an ineffective stroke elimination area K1 where a state in which the standby hydraulic pressure WP is supplied is maintained, a start area K2 where the motorcycle 1 is started by increasing the clutch hydraulic pressure (the slave hydraulic pressure) from the state in which the standby hydraulic pressure WP is supplied, and a clutch touch area (a stroke process) K3 between the ineffective stroke elimination area K1 and the start area K2. In the clutch touch area K3, the clutch hydraulic pressure is raised toward the touch point hydraulic pressure TP (control target value) and the state transitions to the half-clutch state.

The ECU 60 causes the clutch device 26 to perform the stroke in the connection direction until the actual measurement value of the slave hydraulic pressure reaches the control target value (the clutch touch area K3). In the above stroke process K3, control is performed to correct the control target value in accordance with at least one of the rotational speed NE of the engine 13 and the difference between the control target value and the actually measured value. The above control will be described below.

The ECU 60 controls the motor 52 of the clutch actuator 50 on the basis of a duty ratio in the first half of the clutch touch area K3. When the slave hydraulic pressure of the slave cylinder 28 reaches a predetermined control switching hydraulic pressure CP, the ECU 60 performs feedback control for controlling the motor 52 of the clutch actuator 50 and raises the slave hydraulic pressure to the standby hydraulic pressure WP.

<Motor Duty Ratio Control>

Next, an example of motor duty ratio control performed by the ECU 60 at the time of activation of the system will be described with reference to the flowchart of FIG. 8.

Figure 8:
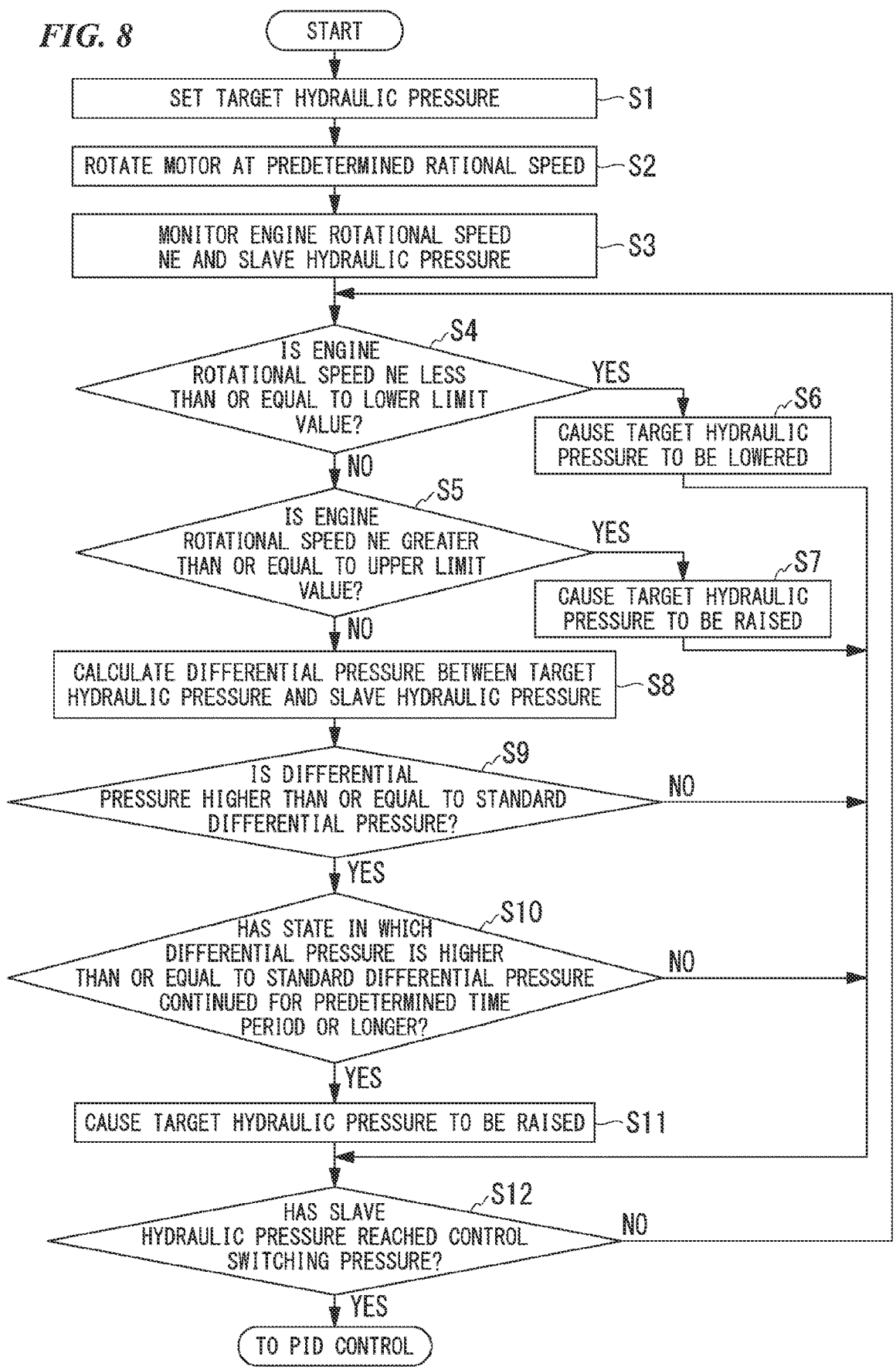
FIG. 8 is a flowchart illustrating a flow of motor duty ratio control at the time of activation of the clutch control device according to the embodiment of the present invention.

As illustrated in FIG. 8, the ECU 60 first sets a target hydraulic pressure in the stroke process K3 in which the clutch device 26 transitions from the disconnected state to the connected state (step S1). Here, the target hydraulic pressure is a clutch capacity that reaches a touch point position where a connection of the clutch device 26 is started, i.e., the touch point hydraulic pressure TP. For example, an initial touch point hydraulic pressure TP (a target hydraulic pressure) set immediately after the activation is pre-stored in the memory 62.

Subsequently, the ECU 60 causes the motor 52 of the clutch actuator 50 to rotate at a predetermined initial motor duty ratio R1 (see FIG. 7) (step S2). Here, the initial motor duty ratio R1 is pre-stored in the memory 62. When the master cylinder 51 is driven by the motor 52, an operating hydraulic pressure is supplied from the master cylinder 51 to the slave cylinder 28. Thereby, an increase in the hydraulic pressure of the slave cylinder 28 (the slave hydraulic pressure) starts. At this time, in the clutch actuator 50, the motor 52 regularly rotates at the initial motor duty ratio R1 and the slave hydraulic pressure rises with a stable inclination.

The ECU 60 monitors the rotational speed of the engine 13 (the engine rotational speed) NE detected by the engine rotational speed sensor 45 and the hydraulic pressure of the slave cylinder 28 side detected by the downstream-side hydraulic pressure sensor 58 (actual measurement values of the slave hydraulic pressure and the clutch capacity) (step S3).

The ECU 60 determines whether or not the rotational speed NE of the engine 13 detected by the engine rotational speed sensor 45 is less than or equal to a predetermined lower limit value (step S4). The clutch device 26 transitions from the disconnected state to the connected state (the half-clutch state) through the slave cylinder 28 as the slave hydraulic pressure rises and the rotational speed NE of the engine 13 is lowered (decreased) when a connection of the clutch device 26 is started. If a connection degree of the clutch device 26 is excessively high, the rotational speed NE of the engine 13 is lowered, which may lead to the stalling of the engine 13. Thus, in step S4, the lower limit value is set so that the engine 13 does not stall. The above lower limit value can be, for example, 1050 rpm, which is less than the idle speed of the engine 13 (for example, about 1200 rpm).

When the rotational speed NE of the engine 13 is less than or equal to the lower limit value (YES in step S4), the ECU 60 corrects the target hydraulic pressure (step S6). The ECU 60 causes the target hydraulic pressure to be decreased by a predetermined pressure value (for example, 10 kPa). The hydraulic pressure on the slave cylinder 28 side (the slave hydraulic pressure) slightly decreases, the connection degree of the clutch device 26 decreases, and the clutch device 26 transitions to the disconnected side (the clutch becomes slippery). Thereby, a decrease in the rotational speed NE of the engine 13 can be limited. After step S6, the process proceeds to step S12.

When the rotational speed NE of the engine 13 exceeds the lower limit value (NO in step S4), the process proceeds to step S5.

In step S5, the ECU 60 determines whether or not the rotational speed NE of the engine 13 detected by the engine rotational speed sensor 45 is greater than or equal to a predetermined upper limit value. Even if the clutch device 26 transitions from the disconnected state to the connected state (the half-clutch state) by the slave cylinder 28 as the slave hydraulic pressure rises, the rotational speed NE of the engine 13, which is rising, may become excessively high (may excessively increase) in accordance with the throttle opening degree TH if the connection degree of the clutch device 26 is excessively low. Thus, in step S5, the upper limit value is set so that the rotational speed NE of the engine 13 does not become excessively high. For example, the above upper limit value can be set to a rotational speed at which the engine rotational speed NE with respect to the throttle opening degree TH can be determined to be clearly high (for example, 3500 rpm with respect to a normal rotational speed NE of 2000 rpm at a throttle opening degree of 20%).

When the rotational speed NE of the engine 13 is greater than or equal to the upper limit value (YES in step S5), the ECU 60 corrects the target hydraulic pressure (step S7). The ECU 60 causes the target hydraulic pressure to be increased by a predetermined pressure value (for example, 10 kPa). The hydraulic pressure on the slave cylinder 28 side (the slave hydraulic pressure) rises slightly, the connection degree of the clutch device 26 increases, and the clutch device 26 transitions to the connection side (the clutch is easily connected). Thereby, an increase in the rotational speed NE of the engine 13 is limited. After step S7, the process proceeds to step S12.

When the rotational speed NE of the engine 13 is less than the upper limit value (NO in step S5), the process proceeds to step S8.

In step S8, the ECU 60 calculates a differential pressure between the slave hydraulic pressure detected by the downstream-side hydraulic pressure sensor 58 and the target hydraulic pressure at that point in time.

Subsequently, the ECU 60 determines whether or not the calculated differential pressure is higher than or equal to a predetermined standard differential pressure (step S9).

When the differential pressure is not higher than or equal to the standard differential pressure (NO in step S9), the process proceeds to step S12.

When the differential pressure is higher than or equal to the standard differential pressure (YES in step S9), the ECU 60 determines whether or not a state in which the differential pressure is higher than or equal to the standard differential pressure has continued for a predetermined time period or longer (step S10).

When the state in which the differential pressure is higher than or equal to the standard differential pressure has continued for the predetermined time period or longer (YES in step S10), the ECU 60 corrects the target hydraulic pressure (step S11). Here, the ECU 60 causes the target hydraulic pressure to be increased by a predetermined pressure value (for example, 10 kPa). Thereby, the speed at which the slave hydraulic pressure increases becomes fast and the slave hydraulic pressure easily reaches the target hydraulic pressure.

When the continuation time period of the state in which the differential pressure is higher than or equal to the standard differential pressure is less than the predetermined time period (NO in step S10), the process proceeds to step S12.

In step S12, the ECU 60 determines whether or not the slave hydraulic pressure has reached a predetermined control switching pressure Cp (see FIG. 7). Also, the control switching pressure Cp is lower than the touch point hydraulic pressure TP.

When the slave hydraulic pressure has not reached the control switching pressure Cp (NO in step S12), the process returns to step S4 and the processing from step S4 is iteratively executed at each specified control interval (1 to 10 msec).

When the slave hydraulic pressure has reached the control switching pressure Cp (YES in step S12), the ECU 60 causes the control of the clutch actuator 50 described above to transition from the motor duty ratio control to the feedback control to be described below.

If the target hydraulic pressure (the control target value) corrected in the above series of processing steps is stored in the memory 62, the clutch device 26 can more smoothly transition from the disconnected state to the connected state from the next system activation.

<Feedback Control>

Referring to FIG. 7, in the clutch control device 60A of the present embodiment, because the actual control parameter (the slave hydraulic pressure) is approximated to the control target value (the target hydraulic pressure) of the clutch capacity after the control switching pressure Cp is reached, the clutch actuator 50 performs feedback control (proportional-integral-differential (PID) control).

In the above-described feedback control, if identical control is performed all the time, the connection of the clutch device 26 may be delayed or the difference between the control target value and the actual measurement value may be excessively large. Also, when the clutch capacity is controlled by the hydraulic pressure, a change in which the slave hydraulic pressure is delayed with respect to a change in the target hydraulic pressure because there is friction (flow resistance in the oil passage or pressure loss) in a hydraulic pressure path. Thus, an event in which the slave hydraulic pressure reaches the touch point hydraulic pressure TP even though the clutch capacity does not reach the touch point hydraulic pressure TP or the slave hydraulic pressure does not reach the touch point hydraulic pressure TP even though the clutch capacity reaches the touch point hydraulic pressure TP or the like may occur.

In the present embodiment, for example, the feedback control of the control parameter (the slave hydraulic pressure) is changed between before and after the touch point hydraulic pressure TP.

The ECU 60 performs feedback control mainly in an I term (integral term) in the ineffective stroke elimination area K1 until the slave hydraulic pressure reaches the control switching pressure Cp and then reaches the touch point hydraulic pressure TP. The clutch device 26 mainly performs the stroke in the area until the touch point hydraulic pressure TP is reached. The measured hydraulic pressure (slave hydraulic pressure) during the clutch stroke corresponds to a sum of the load corresponding to the reaction force of a return spring (a clutch spring) and a load corresponding to the pressure loss.

In the latter half of the clutch touch area K3, an increase in the rotational speed NE of the engine 13 starts in accordance with the throttle opening degree TH. Increases in the motor duty ratio and the I term start after arrival at the clutch touch area K3. At this time, the slave hydraulic pressure is controlled by the basic I term because the deviation from the target hydraulic pressure is small.

At a timing when the slave hydraulic pressure exceeds the touch point hydraulic pressure TP, the I term is reset and the feedback control transitions to feedback control utilizing each of a P term (deviation term), the I term, and a D term (differential term). Because the state of the clutch device 26 after the touch point hydraulic pressure TP changes significantly as compared to that before the touch point hydraulic pressure TP, the feedback control also changes in accordance with the change in the state and overshooting or hunting is prevented.

At the time of half-clutch after the slave hydraulic pressure reaches the touch point hydraulic pressure TP and the clutch connection is started, the process transitions to a load control process (a start area) K2 in which the transfer load is controlled in accordance with the slave hydraulic pressure. After the clutch connection is started, the pressure changes substantially in accordance with the duty ratio. The hydraulic pressure measured in the load control process K2 corresponds to a sum of the return spring load and the pressing load.

Figure 9:
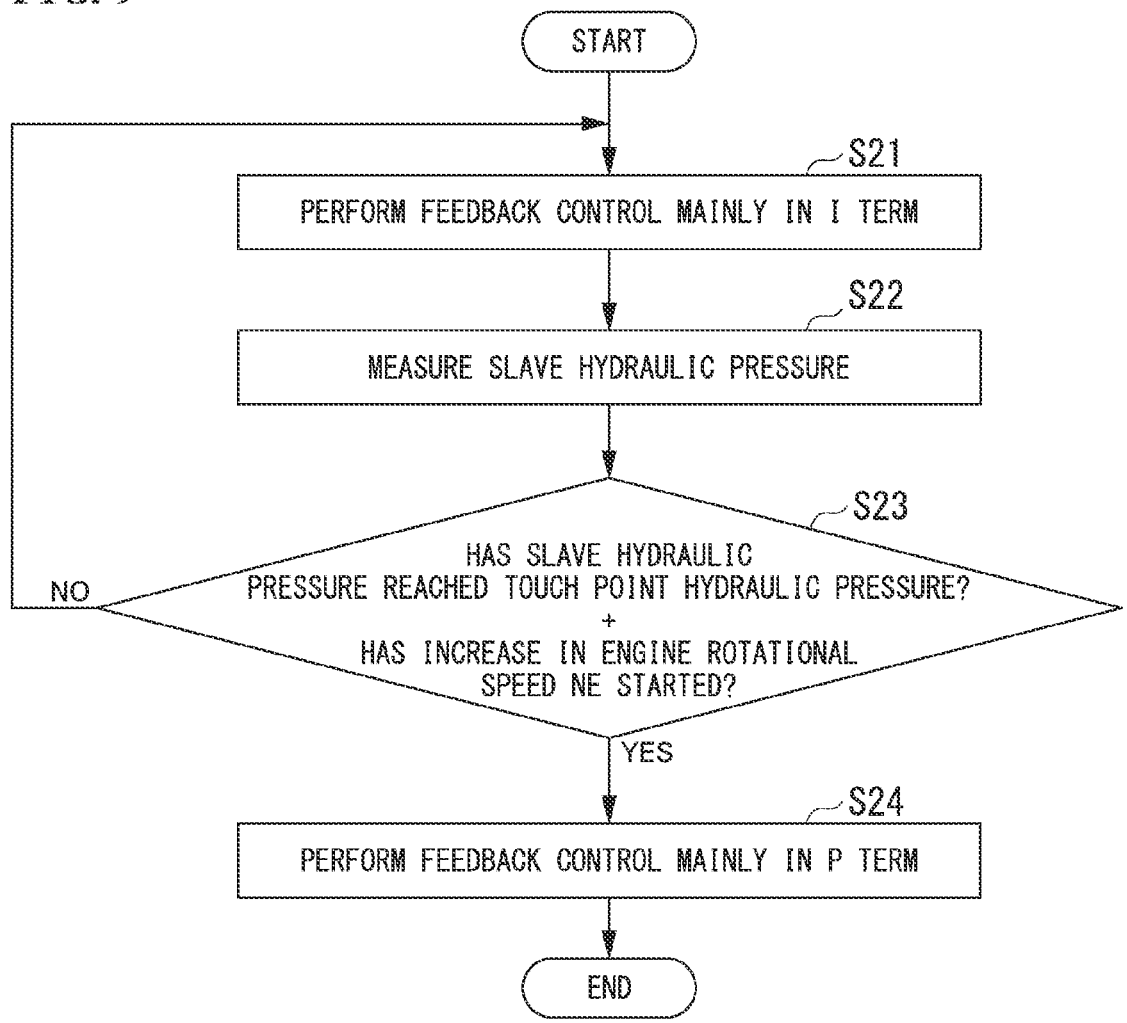
FIG. 9 is a flowchart illustrating a flow of a feedback process at the time of activation according to the embodiment of the present invention.

Next, an example of a process performed by the ECU 60 during the feedback control will be described with reference to the flowchart of FIG. 9. This control flow is iteratively executed at a specified control interval (1 to 10 msec).

First, the ECU 60 performs feedback control mainly in the I item (step S21) and reads a detected value of the downstream-side hydraulic pressure sensor 58 so that the slave hydraulic pressure is measured (step S22).

Subsequently, the ECU 60 determines whether or not the measured slave hydraulic pressure has reached the touch point hydraulic pressure TP and an increase in the engine rotational speed NE has started (step S23).

In at least one of a case when the slave hydraulic pressure has not reached the touch point hydraulic pressure TP and a case when the engine rotational speed NE has not increased (NO in step S23), the process returns to step S21 or the process is temporarily terminated.

When the slave hydraulic pressure has reached the touch point hydraulic pressure TP and the increase in the engine rotational speed NE has started (YES in step S23), the process proceeds to step S24, the control is switched to the feedback control mainly in the P term (or utilizing each of the P, I, and D terms) and the process is temporarily terminated.

An example of a change over time in the clutch control parameter when the feedback control is changed will be described with reference to FIG. 7.

In the latter half of the stroke process K3 (after the control switching pressure Cp is reached), the counter shaft torque and the engine rotational speed NE increase. If the throttle opening degree TH increases, the increase in the engine rotational speed NE starts after the increase in the throttle opening degree TH. For example, a timing of the increase in the engine rotational speed NE with respect to the increase in the throttle opening degree TH can be controlled by the throttle-by-wire system. As the engine rotational speed NE increases, the counter shaft torque gradually increases while waving and eventually causes the vehicle speed to be increased.

Because the deviation between the target hydraulic pressure and the slave hydraulic pressure is small until the touch point hydraulic pressure TP is reached, feedback control is performed mainly in the I term (the integral term). On the other hand, after it is detected that the slave hydraulic pressure has reached the touch point hydraulic pressure TP and the increase in the engine rotational speed NE has started, the hydraulic pressure overshooting and the shock torque are reduced by making a change to an appropriate PID distribution (feedback control mainly in the P term).

As described above, the clutch control device 60A of the above-described embodiment includes the engine 13; the transmission 21; the clutch device 26 configured to connect and disconnect the motive power transfer between the engine 13 and the transmission 21; the clutch actuator 50 configured to drive the clutch device 26 and change the clutch capacity; the downstream-side hydraulic pressure sensor 58 serving as a control parameter sensor configured to detect the target hydraulic pressure which is a control parameter of the clutch capacity; and the ECU 60 configured to calculate the target hydraulic pressure of the clutch capacity. The ECU 60 causes the clutch device 26 to transition from the disconnected state to the connected state (or to perform the stroke) until the actual measurement value of the target hydraulic pressure reaches the touch point hydraulic pressure TP which is the control target value. The ECU 60 corrects the touch point hydraulic pressure TP on the basis of at least one of the rotational speed NE of the engine 13 and a difference between the target hydraulic pressure and the actual measurement value (the slave hydraulic pressure) of the clutch capacity in the stroke process K3 of causing the clutch device 26 to transition in the connection direction.

According to the above configuration, for example, when the engine rotational speed NE decreases or increases unexpectedly in the stroke process K3 of causing the clutch device 26 to transition from the disconnected state to the connected state, the connection position of the clutch device 26 can be accurately adjusted in accordance with the engine state by correcting the target hydraulic pressure on the basis of the engine rotational speed NE. Also, when the engine rotational speed NE fluctuates unexpectedly, the connection position of the clutch device 26 can be accurately adjusted in accordance with the engine state by correcting the target hydraulic pressure on the basis of a difference between the target hydraulic pressure and an actually measured hydraulic pressure. In this way, the transition of the clutch device 26 from the disconnected state to the connected state can be performed more smoothly. Further, the corrected target hydraulic pressure is stored, so that it becomes possible to perform the transition of the clutch device 26 from the disconnected state to the connected state more smoothly from the next time.

Also, in the above-described clutch control device 60A, the ECU 60 causes the target hydraulic pressure to be lowered when the rotational speed NE of the engine 13 becomes less than or equal to the predetermined lower limit value in the above-described stroke process K3.

According to the above configuration, when the engine rotational speed NE becomes less than or equal to the lower limit value in the stroke process K3, for example, it is determined that the clutch device 26 is approaching the connected state faster than expected and the target hydraulic pressure is lowered. Thereby, a connection start timing of the clutch device 26 can be delayed in accordance with the state of the engine 13 and the connection position of the clutch device 26 can be accurately adjusted.

Also, in the above-described clutch control device 60A, the ECU 60 causes the target hydraulic pressure to be raised when the rotational speed NE of the engine 13 becomes greater than or equal to a predetermined upper limit value in the stroke process K3.

According to the configuration, when the engine rotational speed NE is greater than or equal to the upper limit value in the stroke process K3, for example, it is determined that the clutch device 26 has performed the stroke in the connection direction slower than expected and the target hydraulic pressure is increased. Thereby, the connection start timing of the clutch device 26 can be advanced in accordance with the state of the engine 13, and the connection position of the clutch device 26 can be accurately adjusted.

Also, in the above-described clutch control device 60A, the ECU 60 corrects the target hydraulic pressure when a difference between the control target hydraulic pressure and an actual measurement value of the slave hydraulic pressure has continued for a predetermined time period in the above-described stroke process K3.

According to the above configuration, when the actual measurement value of the slave hydraulic pressure deviates from the control target hydraulic pressure, for example, it is determined that the clutch operation timing has deviated due to various causes if the deviated state has continued for the predetermined time period or longer and the control target hydraulic pressure is corrected. Thereby, the connection position of the clutch device 26 can be accurately adjusted.

Also, in the above-described clutch control device 60A, the above-described stroke process K3 is a stroke process K3 until a touch point at which the connection starts from the standby state in which the clutch device 26 has been disconnected is reached.

According to the above configuration, the connection position of the clutch device 26 can be accurately adjusted in the stroke process K3 up to the touch point at which the connection of the clutch device 26 is started.

Also, in the above-described clutch control device 60A, the ECU 60 corrects the touch point hydraulic pressure TP that is a value corresponding to the point at which the connection of the clutch device 26 is started.

According to the above configuration, the connection position of the clutch device 26 can be accurately adjusted by correcting the touch point hydraulic pressure TP at which the connection of the clutch device 26 is started.

Also, in the above-described clutch control device 60A, the ECU 60 switches control between control for controlling the clutch actuator 50 under a given condition and feedback control of approximating the control parameter to the touch point hydraulic pressure TP in the above-described stroke process K3.

According to the above configuration, an actual measurement value of the control parameter can be approximated to the touch point hydraulic pressure TP more smoothly by switching the control between the control of the given condition and the feedback control in the above-described stroke process K3.

Also, in the above-described clutch control device 60A, the ECU 60 changes the motor duty ratio of the clutch actuator 50 in accordance with the accelerator opening degree until the control is switched to the feedback control.

According to the above configuration, the clutch actuator 50 is driven according to the motor duty ratio control based on the accelerator opening degree until the control is switched to the feedback control, so that the hydraulic pressure that could not be stably output by the feedback control alone can be stabilized and output and consequently a fine hydraulic pressure can be controlled accurately.

Also, in the above-described clutch control device 60A, the ECU 60 changes a feedback control method when the above-described control parameter has reached a predetermined touch point hydraulic pressure TP during feedback control.

According to the above configuration, because the feedback control method is changed when the control parameter of the clutch capacity has reached the touch point hydraulic pressure TP, for example, control suitable for each of the clutch touch area K3 before the touch point hydraulic pressure TP is reached and the start area K2 after the standby hydraulic pressure WP is reached can be performed. Thus, the convergence of the control parameters can be accelerated and the connection performance of the clutch device 26 can be improved.

Also, in the above-described clutch control device 60A, the ECU 60 performs feedback control based on the I item in the PID control before the above-described control parameter reaches the touch point hydraulic pressure TP and feedback control based on the P term in the PID control after the above-described control parameter reaches the touch point hydraulic pressure TP.

According to the above configuration, because the weight of each term of the PID control of the clutch actuator 50 is changed between before and after the control parameter of the clutch capacitance reaches the touch point hydraulic pressure TP, appropriate feedback control can be performed. Specifically, feedback control can be performed mainly in the I term (integral term) before the above-described control parameter reaches the touch point hydraulic pressure TP and feedback control can be performed mainly in the P term (deviation term) after the control parameter reaches the touch point hydraulic pressure TP. Thus, the clutch stroke can be accelerated in the stroke process K3 at the initial stage of the clutch operation and the convergence of the control parameters can be accelerated in the load control process K2 at the latter stage of the clutch operation.

The present invention is not limited to the above-described embodiment. For example, the present invention is not limited to the application to a configuration in which the clutch is connected by increasing the hydraulic pressure and the clutch is disconnected by decreasing the hydraulic pressure. The present invention may be applied to a configuration in which the clutch is disconnected by increasing the hydraulic pressure and the clutch is connected by decreasing the hydraulic pressure.

Also, the clutch device 26 may be configured to be disconnected/connected and driven by a mechanism using a rod or the like as well as the hydraulic pressure.

The clutch operating element is not limited to the clutch lever and a clutch pedal or various other operating elements may be used as the clutch operating element.

The application is not limited to a saddle-riding type vehicle in which the clutch operation is automated as in the above-described embodiment. The present invention can also be applied to a saddle-riding type vehicle including a so-called clutch operation-less transmission device configured to enable a shift by adjusting a driving force without performing the manual clutch operation under predetermined conditions while a manual clutch operation is basically performed.

Also, the above-described saddle-riding type vehicle includes all vehicles in which the driver rides across the vehicle body and includes not only motorcycles (including motorized bicycles and scooter type vehicles) but also three-wheeled vehicles (including vehicles with one front wheel and two rear wheels and vehicles with two front wheels and one rear wheel) or four-wheeled vehicles and vehicles including an electric motor as a motor.

The configuration in the above-described embodiment is an example of the present invention and various modifications can be made without departing from the spirit of the present invention.

BRIEF DESCRIPTION OF THE REFERENCE SYMBOLS

1: Motorcycle (saddle-riding type vehicle)
13: Engine
21: Transmission
26: Clutch device
50: Clutch actuator
58: Downstream-side hydraulic pressure sensor (control parameter sensor)
60: ECU (control unit)
60A: Clutch control device
K3: Clutch touch area, stroke process
NE: Rotational speed
TP: Touch point hydraulic pressure (control target value)

The invention claimed is:
1. A clutch control device comprising:
an engine;
a transmission;
a clutch device configured to connect and disconnect motive power transmission between the engine and the transmission;
a clutch actuator configured to drive the clutch device and change a clutch capacity;
a control parameter sensor configured to detect a control parameter of the clutch capacity; and
a control unit configured to calculate a control target value of the control parameter,
wherein the control unit causes the clutch device to perform a stroke in a connection direction until an actual measurement value of the control parameter reaches the control target value,
wherein the control unit corrects the control target value in accordance with at least one of a rotational speed of the engine and a difference between the control target value and the actual measurement value of the control parameter in a stroke process of causing the clutch device to perform the stroke in the connection direction, and wherein, when the rotational speed of the engine is less than or equal to a predetermined lower limit value in the stroke process, the control unit causes the control target value to be decreased.

2. A clutch control device comprising:
an engine;
a transmission;
a clutch device configured to connect and disconnect motive power transmission between the engine and the transmission;
a clutch actuator configured to drive the clutch device and change a clutch capacity;
a control parameter sensor configured to detect a control parameter of the clutch capacity; and
a control unit configured to calculate a control target value of the control parameter,
wherein the control unit causes the clutch device to perform a stroke in a connection direction until an actual measurement value of the control parameter reaches the control target value,
wherein the control unit corrects the control target value in accordance with at least one of a rotational speed of the engine and a difference between the control target value and the actual measurement value of the control parameter in a stroke process of causing the clutch device to perform the stroke in the connection direction, and
wherein, when the rotational speed of the engine is greater than or equal to a predetermined upper limit value in the stroke process, the control unit causes the control target value to be increased.

3. The clutch control device according to claim 1, wherein, when the difference between the control target value and the actual measurement value has continued for a predetermined time period in the stroke process, the control unit corrects the control target value.

4. The clutch control device according to claim 2, wherein, when the difference between the control target value and the actual measurement value has continued for a predetermined time period in the stroke process, the control unit corrects the control target value.

5. The clutch control device according to claim 1, wherein the stroke process is a stroke process from a standby state in which the clutch device has been disconnected to a touch point at which a connection is started.

6. The clutch control device according to claim 2, wherein the stroke process is a stroke process from a standby state in which the clutch device has been disconnected to a touch point at which a connection is started.

7. The clutch control device according to claim 1, wherein the control target value is a value corresponding to a point at which a connection of the clutch device is started.

8. The clutch control device according to claim 2, wherein the control target value is a value corresponding to a point at which a connection of the clutch device is started.

9. A clutch control device comprising:
an engine;
a transmission;
a clutch device configured to connect and disconnect motive power transmission between the engine and the transmission;
a clutch actuator configured to drive the clutch device and change a clutch capacity;
a control parameter sensor configured to detect a control parameter of the clutch capacity; and
a control unit configured to calculate a control target value of the control parameter,
wherein the control unit causes the clutch device to perform a stroke in a connection direction until an actual measurement value of the control parameter reaches the control target value,
wherein the control unit corrects the control target value in accordance with at least one of a rotational speed of the engine and a difference between the control target value and the actual measurement value of the control parameter in a stroke process of causing the clutch device to perform the stroke in the connection direction, and
wherein the control unit switches control between control for controlling the clutch actuator under a given condition and feedback control for approximating the control parameter to the control target value in the stroke process.

10. The clutch control device according to claim 9, wherein the control unit changes a motor duty ratio of the clutch actuator in accordance with an accelerator opening degree until the control is switched to the feedback control.

* * * * *